No. 816,700. PATENTED APR. 3, 1906.
M. BARR.
TRACER AND TOOL FOR ENGRAVING MACHINES.
APPLICATION FILED FEB. 6, 1903.

Witnesses
Henry Hart

Inventor
Mark Barr
per Chas. A. Woodruff
Attorney

UNITED STATES PATENT OFFICE.

MARK BARR, OF LONDON, ENGLAND, ASSIGNOR, BY MESNE ASSIGNMENTS, TO LINOTYPE & MACHINERY LIMITED, OF LONDON, ENGLAND.

TRACER AND TOOL FOR ENGRAVING-MACHINES.

No. 816,700.           Specification of Letters Patent.           Patented April 3, 1906.

Original application filed October 13, 1900, Serial No. 32,999. Divided and this application filed February 6, 1903. Serial No. 142,686.

*To all whom it may concern:*

Be it known that I, MARK BARR, of 25 Kensington Court Gardens, London, in the county of Middlesex, England, have invented certain new and useful Improvements in the Tracers and Tools of Engraving-Machines; and I do hereby declare the following to be a full, clear, and exact description of the invention, such as will enable others skilled in the art to which it appertains to make and use the same.

The present invention consists in improved tracers and tools for use in an engraving-machine.

It is a division from my pending application Serial No. 32,999, filed October 13, 1900.

In any engraving-machine—such, for instance, as the well-known Benton-Waldo or the Ballou engraving-machines—for producing objects which, like dies, have three dimensions—length, width, and depth of design—it is essential that the cutting edges of the tool shall have the same form as the tracer end, the dimensions of those edges being at the same time modified according to the desired ratio between pattern and object. In all such engraving-machines it is the motion of the axis of the tracer end which is transmitted to and reproduced proportionally and with more or less accuracy in the axis of the tool; but as the tracer end has necessarily a finite thickness the pattern will be touched as the said end is moved over it by points in the surface of the tracer end which are radially on one side of the axis of that end. Consequently it is the motions of those points as distinguished from the motions of points situated in the said axis and in the same horizontal plane that are reproduced in homologous points in the surface of the tool.

Now I am convinced that the principles laid down in the preceding paragraph have not been appreciated hitherto at their true value or have not been carried into effect.

An engraving-machine is called upon to produce objects in many ratios. That has hitherto necessitated an indefinitely large number of tools, so as to be ready for an object in any ratio to the pattern. Further, as it is impracticable to grind a tool held in any head-stock other than the one in which it is to be used a corresponding number of head-stocks, each holding the respective tool, is a second necessity, and, furthermore, when a tool is wanted to work to a given ratio it must be ground to the necessary form at a moment's notice.

Figure 3:
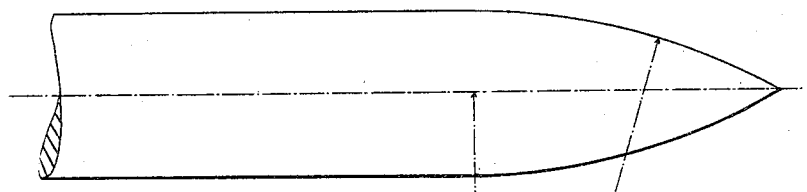
Figure 1:
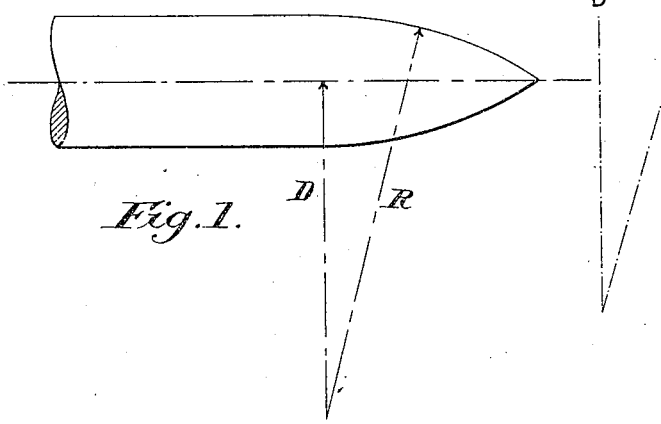
Figure 4:
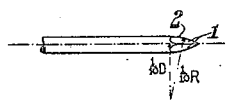
Figure 2:
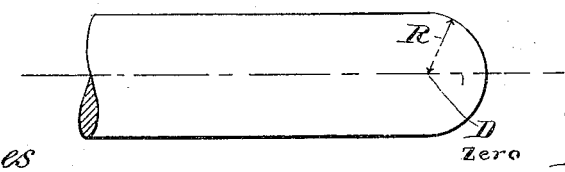

Referring to the accompanying drawings, which are to be taken as part of this specification and read therewith, Figures 1 and 2 are side elevations of two different forms of tracer ends, showing the effect of varying relations of the elements D and R; and Figs. 3 and 4 are side elevations, drawn to an exaggerated scale, of portions of a tracer and tool, respectively, the operating ends of which have relationships according to the present invention.

One result of the present invention is that the tracer-rod is equipped with only a comparatively small number of tracer ends. The forms of these ends are such as will be convenient generally—say, blunt, curved, ball-pointed, and sharp. These ends are for tracing over any pattern which may be brought to the engraving-machine to be worked from, and for each ratio between pattern and object corresponding tools are ground.

The present invention requires that the "form" (using this word as including all the geometric elements) of each of the tracer ends mentioned in the preceding paragraph shall be one that is easily expressed by one or more simple elements or coördinates. These appear first in the tracer end to be afterward reproduced in the tool. The easiest process for giving the desired form to a tracer end is well known to users of engraving-machines to be one of grinding, the unground end being held up to the grinder at right angles with its surface and rocked about a center of oscillation situated somewhere along the axis of the tracer end or to one side thereof. Now the radius R of the curvature of the ground end and the distance D of the center of oscillation from the axis of the tracer end, (see Fig. 1,) are the two simple elements or coördinates above mentioned, and their respective dimensions settle the form of the tracer end. If R be infinite and D be zero, there will not be any curvature at all, although such a case would not occur in the practical use of the invention. If, as indicated in Fig. 2, R equals the radius of the cross-section of the unformed tracer end and D be zero, the form of that end will be hemispherical, and it will acquire acuteness in proportion as D is made longer, as will be readily appreciated from a comparison of Figs. 1 and 2. All the tracer ends are according to the present invention bodies of revolution—i. e., any section at right angles with the axis is exactly circular—and each one is for the purpose of the invention marked with the respective values of R and D.

The tools of an engraving-machine, as indicated in Fig. 4, are not round in cross-section, as are the tracer ends, for they must have faces 1 to produce edges 2 that will cut as they rotate. Hence the elements of the tracer end, Fig. 3, are not reproduced along the faces 1 of the tool, but along the cutting edges 2 of it. So in making a tool which shall be, for instance, a tenth of the tracer end having the elements R and D, as indicated in Figs. 3 and 4, the respective adjusting devices of the grinding-machine are not set to one-tenth R and one-tenth D, respectively, but to such values as will give the elements one-tenth R and one-tenth D to the tool edges. Now when a tool with alternate flats and edges is at work the sides of the hole or of the gutter which it cuts have a radius less than that of the faces. So either graphically or mathematically the corresponding radii of faces and edges are determined for each type of tracer end.

I must point out that the tracers and tools of this invention can never be conical in form—that is to say, their sides can never be straight lines—because of the influence of the constant element R.

I claim—

A tracer and tool for use in a pantograph engraving-machine, each formed of a rod having a curved working end lying in a surface of revolution about the axis of its rod, the contours of said end being defined by two finite geometrical distances, viz., the radius of curvature of said curved end and the perpendicular distance of the center of this curvature from the axis of the rod; the said distances being so short as to produce a perceptible curvature; the said distances for the tracer being proportional to those for the tool.

In witness whereof I have hereunto set my hand in the presence of two witnesses.

MARK BARR.

Witnesses:
BERNE NADALL,
CHAS. S. WOODROFFE.